2,951,831

TERPOLYMER OF A CONJUGATED DIOLEFIN, A STYRENE, AND AN ALLYL ALCOHOL

Raymond H. Reinhard, Galveston, and John E. Fox, Texas City, Tex., assignors to Monsanto Chemical Company, St. Louis, Mo., a corporation of Delaware No Drawing. Filed Dec. 5, 1955, Ser. No. 550,821

6 Claims. (Cl. 260—80.7)

This invention relates to new compositions of matter and, more particularly, it relates to new terpolymers containing hydroxyl groups.

An object of the present invention is the provision of new synthetic resins.

Another object of the invention is to provide new low molecular weight interpolymers.

A still further object of the invention is to provide terpolymer systems containing aromatic nuclei and hydroxyl groups cross-linked by means of an unsaturated conjugated diene.

These and other objects of the invention are attained by interpolymerizing a styrene compound with allyl alcohol or methallyl alcohol and a conjugated diene at elevated temperatures under autogenous pressure or elevated pressures.

The invention is illustrated in the following examples but these are not to be construed as limiting its scope in any manner. All parts given are by weight.

Example I

A mixture of 1086.4 parts of allyl alcohol, 465.6 parts of styrene monomer, 62.0 parts of butadiene and 48.0 parts of di-tert-butyl peroxide was charged to a continuous tubular reactor immersed in a constant temperature bath. The mixture was fed at a rate such that it was subjected to polymerization at a temperature of 200° C. and a pressure of 1000 p.s.i.g. for a period of 30 minutes during passage through the reactor. Unreacted butadiene was recovered by means of a cold trap located in the product vent line. In order to ensure the most complete recovery of this reactant, the reaction product emerging from the reactor was refluxed for one hour with a cold trap placed on the reflux condenser. Only 2 parts of butadiene was recovered representing a conversion of 97% of this monomer. The reaction mixture, a colorless syrup comprising a solution of the polymer in unreacted monomers, was then heated under vacuum in a 5-liter, three-necked flask fitted with a thermometer and total take-off head to a temperature of 200° C. to remove unreacted monomers after which the polymer product was allowed to cool. Approximately 426 parts of a brittle, opaque, white solid was obtained representing a conversion of the monomers of 26.4%.

Infrared analysis indicated the presence of benzene nuclei, hydroxyl groups and conjugated double bonds in the polymeric material. Elemental analysis was as follows:

C, 86.15, 86.43; H, 4.02, 4.25;
O (by difference), 9.83, 9.32.

The hydroxyl content of the polymer calculated from these analyses was 10.45 and 9.89% by weight. A solution containing 0.6000 g. of the terpolymer in 50.00 ml. of C.P. toluene had a specific viscosity of 0.054. The terpolymer is soluble in xylene, dimethylformamide, methyl ethyl ketone, carbon tetrachloride and a benzene-methanol mixture. The composition of the ternary interpolymer derived from approximately 67% by weight of allyl alcohol, 29% of styrene and 4% of butadiene calculated from the C—H analysis, the conversion of the monomers to polymer, and the amount of butadiene used was found to be substantially 35% by weight of allyl alcohol, 50% styrene and 15% butadiene. The amount of allyl alcohol corresponds to about 2.6% primary alcohol groups by weight based on the weight of the terpolymer.

Example II

Following the same procedure described in Example I, a mixture of 1086.4 parts of allyl alcohol, 465.6 parts of styrene monomer, 93.0 parts of butadiene, and 48.0 parts of di-tert-butyl peroxide was polymerized at 200° C. and 1000 p.s.i.g. for 30 minutes. About 347.5 parts of the terpolymer was recovered as a brittle opaque white solid representing a conversion of 21.1% of the monomers charged. Only 6.5 parts of unreacted butadiene were recovered, thus 94% of the butadiene charged was converted into the interpolymer.

The terpolymer from this feed mixture of 66% by weight of allyl alcohol, 28% of styrene and 6% butadiene had the following composition: 32% by weight of allyl alcohol, 43% styrene, and 25% butadiene. The amount of allyl alcohol corresponds to about 1.9% primary alcohol groups by weight based on the weight of the terpolymer. Analysis of the terpolymer material gave the following results:

C, 87.07, 86.94; H, 4.17, 4.28;
O (by difference), 8.76, 8.98.

Hydroxyl content calculated from this analysis was 9.30% and 9.56% by weight. The specific viscosity of a solution of 0.6000 g. of the polymeric product in 50.00 ml. of C.P. toluene was 0.058. The material was found to be soluble in methyl ethyl ketone, benzene-methanol, carbon tetrachloride, and dimethyl formamide.

The invention is not to be considered as strictly limited to the exact reactants, quantities, etc., set forth in the examples. Variations in relative composition, in monomer raw materials, and in process condition may be made without departing from the scope of the invention. For purposes of the invention, for example, ortho-, meta-, and para-, methyl, ethyl, butyl, etc., styrenes, ortho-para or ortho-meta dimethyl or diethyl styrenes, the mono-, di-, and trichlorostyrenes, ortho-methyl, para-chlorostyrene, etc., are all as useful as styrene. Mixtures of two or more members of these styrene-type materials may also be used. Methallyl alcohol may be considered an equivalent of the allyl alcohol component or mixtures of allyl and methallyl alcohols may also be used. Other conjugated diolefins such as pentadiene, cyclopentadiene and the like as well as chloroprene may also be substituted for the butadiene of the examples.

The allyl alcohol component may vary from 1% to 50% by weight of the polymer, the styrene component from 20% to 90% and the conjugated diolefin or diene component from 1% to 40%.

Polymerization may be carried out either in the presence or absence of a catalyst but it is preferred to use a free radical polymerization catalyst. In addition to di-tert-butyl peroxide, such free radical initiators as benzoyl peroxide, lauroyl peroxide, tert-butyl perbenzoate, pinacolone peroxide, and the like may be used. The amount of initiator required is in the range from about 0.1% to about 5% by weight of the monomer mixture. Preferably, the quantity of initiator or catalyst is kept within the range from about 1% to about 3%.

The mixtures of the invention may be polymerized at temperatures in the range from about 100° C. to about 250° C., with temperatures in the range from about 180° to about 220° C. being preferred. Generally, the three monomeric components are mixed together with a free radical initiator and the mixture is then heated in a closed reaction vessel under autogenous pressure. If desired, however, higher pressures up to about 2000 p.s.i.g. may be used. At the preferred temperatures, the operation is preferably conducted at pressures in the range from 1000 to 1500 p.s.i.g.

Contact time or polymerization time in the reactor depends upon the conversion desired under the chosen conditions. Under the preferred conditions of temperature and pressure a reaction time of 15 to 60 minutes should be used to obtain conversions ranging from 20% to 50%.

The polymeric products are generally syrupy liquids which comprise a solution of the terpolymer in unreacted monomer and/or solvent from which the terpolymer may be readily recovered either by vacuum distillation up to 200° C. or by other conventional drying means. The terpolymers are generally rather brittle solids characterized by opaqueness and having little or no color. If desired, the monomer mixture may be polymerized in a solvent medium using a compound or mixture of compounds with which the monomers are miscible and in which the terpolymer product is soluble. Among such suitable solvents may be mentioned ethylbenzene, xylene, cyclohexane, methyl ethyl ketone, a benzene-methanol mixture, and the like.

The polymers of this invention are particularly useful in coating compositions as the main constituent thereof with relatively minor amounts of other coating resins such as alkyd resins, phenol-, urea-, and melamine-formaldehyde coating resins, epoxy resins, etc. Or the terpolymers may be used in relatively small amounts as modifiers for the other coating resins. The following example describes one application.

*Example III*

A solution of about 5 parts of the allyl alcohol-styrene-butadiene terpolymer in 15 ml. of a xylene-butanol (1:1) mixture was prepared. Approximately 8 ml. of a solution of a trimethylol melamine butyl ether in a xylene-butanol (1:1) solvent mixture having a solids content of about 50% was added to the polymer solution and the two solutions were thoroughly mixed to yield a clear homogeneous solution. A thin layer of this solution was spread on a 10-mil coke steel tin plate and allowed to air dry for about 20 minutes at room temperature. The film was then "set" by heating or baking at 150° C. for 20 minutes. The cured film was hard, clear, alkali-resistant and exhibited good adhesion to the metal.

Various pigments, fillers, dyes, and other conventional additives may be added to the solutions such as that of Example III to yield coating compositions. Organic solvents other than the xylene-butanol mixture may also be used such as ketones like acetone and methyl ethyl ketone, benzene, and mixtures of xylene and benzene with alcohols other than butanol.

What is claimed is:

1. A terpolymer comprising an alcohol component selected from the group consisting of allyl alcohol and methallyl alcohol and mixtures thereof in an amount varying from about 1% to about 50% by weight, a second component chosen from the group consisting of styrene, ring-substituted alkyl styrenes, ring-substituted chlorostyrenes, ring-substituted alkyl chlorostyrenes and mixtures thereof in an amount varying from about 20% to about 90% by weight, and a conjugated diolefin component in an amount varying from about 1% to about 40% by weight.

2. A terpolymer as in claim 1 where the alcohol component is allyl alcohol.

3. A terpolymer as in claim 1 where the second component is styrene.

4. A terpolymer as in claim 1 where the conjugated diolefin component is butadiene.

5. A terpolymer as in claim 1 wherein the alcohol component is allyl alcohol, the second component is styrene, and the conjugated diolefin component is butadiene.

6. A terpolymer comprising an alcohol component selected from the group consisting of allyl alcohol and methallyl alcohol and mixtures thereof in an amount varying from about 1% to about 50% by weight, a second component selected from the group consisting of styrene, ring-substituted alkylstyrenes, ring-substituted chlorostyrenes, ring-substituted alkyl chlorostyrenes and mixtures thereof in an amount varying from about 20% to about 90% by weight, and a third component selected from the group consisting of conjugated diolefins and chloroprene in an amount varying from about 1% to about 40% by weight.

References Cited in the file of this patent

UNITED STATES PATENTS

| | | |
|---|---|---|
| 2,066,330 | Carothers et al. | Jan. 5, 1937 |
| 2,404,220 | D'Alelio | July 16, 1946 |
| 2,419,221 | Kenyon et al. | Apr. 22, 1947 |
| 2,476,341 | Weber | July 19, 1949 |
| 2,640,039 | Williams | May 26, 1953 |